US010530023B2

(12) United States Patent
Flahaut et al.

(10) Patent No.: US 10,530,023 B2
(45) Date of Patent: Jan. 7, 2020

(54) COOLING ELEMENT

(71) Applicant: Bayerische Motoren Werke Aktiengesellschaft, Munich (DE)

(72) Inventors: Nicolas Flahaut, Munich (DE); Sebastian Siering, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 185 days.

(21) Appl. No.: 15/178,721

(22) Filed: Jun. 10, 2016

(65) Prior Publication Data

US 2016/0285145 A1  Sep. 29, 2016

Related U.S. Application Data

(63) Continuation of application No. PCT/EP2014/074449, filed on Nov. 13, 2014.

(30) Foreign Application Priority Data

Dec. 11, 2013 (DE) .................. 10 2013 225 523

(51) Int. Cl.
*H01M 10/6569* (2014.01)
*H01M 10/6556* (2014.01)
*H01M 10/617* (2014.01)
*H01M 10/613* (2014.01)
*H01M 10/647* (2014.01)
*F28F 9/02* (2006.01)
*F28D 21/00* (2006.01)
*H01M 10/625* (2014.01)

(52) U.S. Cl.
CPC ......... *H01M 10/6569* (2015.04); *F28F 9/026* (2013.01); *H01M 10/613* (2015.04); *H01M 10/617* (2015.04); *H01M 10/625* (2015.04); *H01M 10/647* (2015.04); *H01M 10/6556* (2015.04); *F28D 2021/0029* (2013.01); *H01M 2220/20* (2013.01)

(58) Field of Classification Search
CPC ............. H01M 10/613; H01M 10/617; H01M 10/625; H01M 10/647; H01M 10/6556; H01M 10/6569; H01M 2220/20; F28F 9/026; F28D 2021/0029
See application file for complete search history.

(56) References Cited

U.S. PATENT DOCUMENTS

| | | | | |
|---|---|---|---|---|
| 4,578,324 A * | 3/1986 | Koehler | ............... | F28D 15/0275 429/434 |
| 6,106,972 A * | 8/2000 | Kokubo | .............. | H01M 2/1083 429/120 |
| 2002/0007641 A1 | 1/2002 | Marsala | | |
| 2005/0262872 A1 * | 12/2005 | Sacks | ....................... | F25B 39/02 62/500 |
| 2006/0011326 A1 * | 1/2006 | Yuval | .................... | F28D 1/0475 165/80.4 |
| 2007/0267232 A1 * | 11/2007 | Saito | ................... | F02M 25/0827 180/65.285 |
| 2009/0025409 A1 * | 1/2009 | Kopko | .................... | F25B 39/04 62/186 |
| 2010/0147488 A1 | 6/2010 | Pierre et al. | | |
| 2011/0132580 A1 | 6/2011 | Herrmann et al. | | |
| 2011/0174004 A1 | 7/2011 | Heckenberger et al. | | |
| 2011/0222239 A1 * | 9/2011 | Dede | ........................ | F28F 7/02 361/689 |
| 2013/0011713 A1 * | 1/2013 | Harada | ............... | H01M 2/1077 429/120 |
| 2013/0189557 A1 | 7/2013 | Haussmann | | |

FOREIGN PATENT DOCUMENTS

| | | |
|---|---|---|
| CN | 101847762 A | 9/2010 |
| CN | 102057532 A | 5/2011 |
| CN | 102112841 A | 6/2011 |
| CN | 103155264 A | 6/2013 |
| DE | 10 2005 058 153 A1 | 11/2006 |
| DE | 601 25 085 T2 | 7/2007 |
| DE | 10 2008 027 293 A1 | 12/2009 |
| DE | 10 2009 029 629 A1 | 6/2010 |
| DE | 10 2010 032 899 A1 | 2/2012 |
| EP | 2 149 771 A1 | 2/2010 |
| WO | WO 2010/012772 A1 | 2/2010 |
| WO | WO 2012/013582 A1 | 2/2012 |

OTHER PUBLICATIONS

Machine translation of CN 101847762 A, published on Sep. 29, 2010 (Year: 2010).*
Chinese-language Office Action issued in counterpart Chinese Application No. 201480056091.9 dated Feb. 7, 2018 with English translation (Eleven (11) pages).
International Search Report (PCT/ISA/210) issued in PCT Application No. PCT/EP2014/074449 dated Feb. 5, 2015 with English translation (Six (6) pages).
German-language Written Opinion (PCT/ISA/237) issued in PCT Application No. PCT/EP2014/074449 dated Feb. 5, 2015 (Six (6) pages).

(Continued)

*Primary Examiner* — Anca Eoff
(74) *Attorney, Agent, or Firm* — Crowell & Moring LLP

(57) ABSTRACT

A cooling element is provided for at least one object, in particular for a high-voltage battery. The cooling element includes a coolant inlet, to which a refrigerant can be supplied and which is connected to a main line. The cooling element is designed to transfer heat from the object to the refrigerant. The cooling element further includes at least one distributor which distributes the refrigerant from the main line to a plurality of parallel lines, wherein the refrigerant is present in the cooling element as a two-phase mixture and the distributor is configured to distribute the refrigerant uniformly to the parallel lines.

18 Claims, 3 Drawing Sheets

(56) References Cited

OTHER PUBLICATIONS

German-language Search Report issued in counterpart German Application No. 10 2013 225 523.3 dated Jul. 21, 2014 with partial English translation (Thirteen (13) pages).
Chinese-language Office Action issued in counterpart Chinese Application No. 201480056091.9 dated Jun. 1, 2017 with English translation (Twelve (12) pages).
Chinese-language Office Action issued in counterpart Chinese Application No. 201480056091.9 dated Jul. 27, 2018 with English translation (12 pages).
German-language Official Invitation of the European Patent Office issued in counterpart European Application No. 14796775.6 dated May 14, 2018 (five (5) pages).

\* cited by examiner

COOLING ELEMENT

CROSS REFERENCE TO RELATED APPLICATIONS

This application is a continuation of PCT International Application No. PCT/EP2014/074449, filed Nov. 13, 2014, which claims priority under 35 U.S.C. § 119 from German Patent Application No. 10 2013 225 523.3, filed Dec. 11, 2013, the entire disclosures of which are herein expressly incorporated by reference.

BACKGROUND AND SUMMARY OF THE INVENTION

The present invention relates to a cooling element for an object, in particular for a high-voltage battery. Furthermore, the invention relates to a high-voltage battery which includes a cooling element of this type.

Vehicles, in particular electric vehicles and hybrid vehicles, are known in the prior art. In order to ensure the range, service life and power that can be demanded by electric vehicles or hybrid vehicles, a predefined temperature management of the high-voltage batteries of the vehicles is required. It is crucial for this purpose that a temperature spread between individual cells of the high-voltage batteries is kept as low as possible. To this end, use is made of refrigerants which safely and reliably cool the high-voltage batteries, in particular by way of a cooling circuit of the vehicle.

If a plurality of high-voltage batteries are present in a vehicle, care should be taken in particular to ensure that all of said high-voltage batteries undergo uniform cooling. However, this cannot be realized with cooling elements from the prior art.

It is therefore the object of the invention to provide a cooling element for an object, which cooling element ensures safe and reliable cooling of the object while being simple and cost-effective to produce and install.

This and other objects are achieved by a cooling element according to embodiments of the invention. A cooling element is provided which can be used for an object, in particular for a high-voltage battery. The cooling element comprises a refrigerant inlet and at least one distributor. A refrigerant can be supplied to the cooling element at the refrigerant inlet, wherein the cooling element is designed to transmit heat from the object to the refrigerant. The refrigerant inlet is, in particular, part of a main line of the cooling element, wherein the main line is connected to the distributor. The distributor serves for dividing the refrigerant between a multiplicity of parallel lines. The refrigerant entering the main line through the refrigerant inlet is therefore divided into a multiplicity of parallel lines, wherein the parallel lines advantageously serve for cooling the object. A plurality of objects are preferably present, wherein at least one cooling line cools at least one object.

According to the invention, the refrigerant in the cooling element is present as a two-phase mixture. The distributor is designed in turn, according to the invention, to distribute the refrigerant uniformly between the lines. Since a uniformly distributed temperature always has to be present, in particular in a high-voltage battery, the cooling element according to the invention is advantageously usable. Uniform cooling of the object is ensured by the uniform division of the refrigerant into the individual parallel lines. Therefore, a high-voltage battery, in particular, is optimally cooled, and therefore the high-voltage battery permits a long service life and optimum energy storage and energy output.

The distributor is preferably designed such that the distributor divides the refrigerant between the parallel lines in such a manner that the same mixing ratio of the two-phase mixture is present in each parallel line. The same mixing ratio is particularly preferably present in each parallel line and in the main line. In the main line, the refrigerant is present in particular as a mixture of liquid and gaseous phase constituents. In order to ensure uniform cooling of the object, it is provided in particular that each parallel line has the same mixing ratio as in the main line. This can be achieved in an advantageous manner by the cooling element according to the invention with the preferred configuration of the distributor. The advantageously configured distributor therefore permits safe and uniform cooling of the object.

The cooling element is advantageously designed in such a manner that a predefined region of the main line directly upstream of the distributor includes exclusively rectilinear sections. The predefined region of the main line therefore has a homogeneous mixing ratio of the refrigerant. The refrigerant with the homogeneous mixture is therefore divided in the distributor such that each parallel line also has the homogeneous mixture. Alternatively, there is at least one curved section in the predefined region of the main line. It is additionally preferably provided here that the curved section has a source of interference. The source of interference is, in particular, an edge and is advantageously arranged in a radially outer inner wall of the main line. Homogenization of the refrigerant is thereby achieved. In particular, in the curved section, a liquid phase constituent is separated from a gaseous phase constituent since the latter is pressed against the radially outer inner wall of the main line by a centrifugal force which is present. By means of the source of interference, the refrigerant is advantageously homogenized by the liquid phase constituent being separated from the inner wall.

In addition, the cooling element is preferably designed in such a manner that all of the parallel lines are arranged vertically in the same plane. Alternatively, the parallel lines are arranged at least substantially vertically in a plane. As a further alternative, the parallel lines are arranged at different height levels, wherein the distributor or a section of the main line directly upstream of the distributor includes a source of interference. The source of interference is, in particular, an edge on an inner wall of the main line. Homogenization of the refrigerant is achieved by the source of interference. This avoids a separation of the two-phase mixture, which separation may take place by the distribution of the refrigerant between parallel lines which are arranged horizontally in different planes. Since liquid phase constituents are accumulated on horizontally lower planes due to gravity, there is the risk that parallel lines positioned high up vertically will obtain only gaseous phase constituents and parallel lines positioned down low vertically will obtain only liquid phase constituents. The preferred provision of a source of interference homogenizes the refrigerant, and therefore each parallel line obtains the same phase mixture even in the event of different height levels.

The cooling element is advantageously designed in such a manner that a pressure loss within the parallel lines is identical or at least substantially identical. By way of the identical pressure loss, a coolant flow within the parallel lines is also identical or at least virtually identical. A cooling line of the individual parallel lines is therefore identical or at least substantially identical.

In addition, a predefined distance is advantageously maintained between an expansion valve and the distributor. Since an expansion valve has effects on the phase composition of the refrigerant, the predefined distance is maintained. Homogenization of the refrigerant is achieved within the predefined distance, and therefore the distributor distributes the homogeneous refrigerant to the parallel lines.

A nozzle is preferably present in the main line directly upstream of the distributor. The nozzle homogenizes the refrigerant, and therefore the distributor obtains a homogeneous refrigerant and thus distributes the homogeneous refrigerant to the parallel lines. The use of the nozzle is, in particular, advantageous if the abovementioned predefined distance between the expansion valve and the distributor is not maintained.

The cooling element advantageously has a reduction in at least one of the parallel lines. The reduction makes it possible, in particular, to equalize pressure losses within the parallel lines. A reduction is thus advantageously provided in a parallel line which otherwise, compared with the other parallel lines, would have a smaller pressure loss and therefore an increased cooling power. The reduction according to the invention therefore ensures uniform cooling of the object.

The cooling element preferably has a symmetrical distributor. By way of the symmetrical distribution, the same mixing ratio of the refrigerant is transmitted to the parallel lines. An identical distribution of the refrigerant to the parallel lines can therefore be achieved.

Finally, it is provided according to the invention that the two-phase mixture has a liquid and a gaseous phase. This is advantageous in the configuration of refrigerant circulation processes.

The invention furthermore relates to a high-voltage battery which includes the previously described cooling element. The high-voltage battery advantageously has a plurality of battery modules, wherein each battery module is assigned at least one parallel line. The high-voltage battery can be cooled in particular uniformly by the cooling element, and therefore temperature spreads between the battery modules of the high-voltage battery are very substantially avoided. A service life and/or an energy storage capacity and/or an energy output capacity of the high-voltage battery are/is therefore advantageously optimized.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
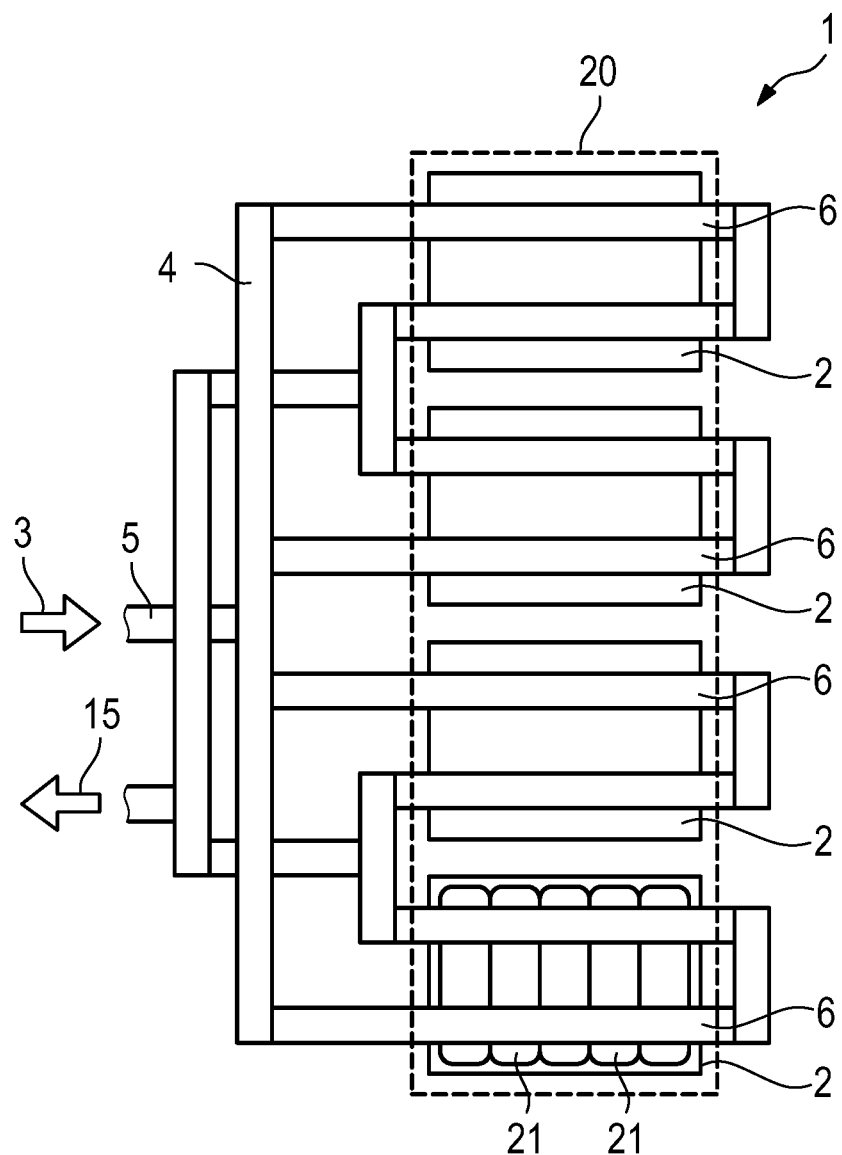
FIG. 1 is a schematic view of a cooling element according to a first exemplary embodiment of the invention on an object.

FIG. 1 shows a cooling element 1 which serves for cooling a high-voltage battery 20 having four battery modules 2. The battery modules 2 include a multiplicity of battery cells 21 which are always to be cooled uniformly. In particular, a temperature spread within the high-voltage battery 20 is to be avoided. Each battery module 2 is therefore assigned a parallel line 6 of the cooling element 1, wherein the parallel lines 6 are connected to a main line 5 via a distributor 4. The main line 5, in turn, has a refrigerant inlet 3. The refrigerant can therefore be supplied to the parallel lines 6 via the distributor 4. After the refrigerant has cooled the high-voltage battery 20, the refrigerant can be output via a refrigerant outlet 15.

The refrigerant is present at the refrigerant inlet 3 in particular as a two-phase mixture, wherein a first phase is a liquid phase and a second phase is a gaseous phase of the refrigerant. In order to distribute the refrigerant uniformly to the parallel lines 6, the distributor 4 is a symmetrical distributor. In addition, each battery module 2 and therefore each parallel line 6 is arranged in the same plane, and therefore all of the parallel lines 6 have the same height level as the main line 5. The influence of a vertical division of the mixture into a liquid phase and into a gaseous phase because of gravity is therefore minimized, since said division relates to each of the parallel lines 6. A mixing ratio between solid phase and liquid phase is therefore retained, and therefore both the main line 5 and each parallel line 6 have the same mixing ratio.

Figure 2:
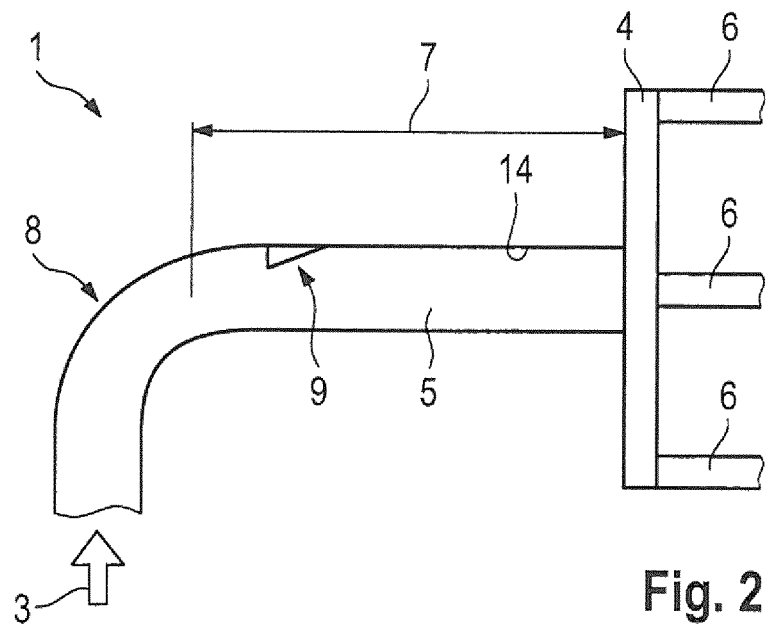
FIG. 2 is a schematic view of a cooling element according to a second exemplary embodiment of the invention.

FIG. 2 shows a cooling element 1 according to a second exemplary embodiment of the invention. In the second exemplary embodiment, the cooling element 1 has the same components as in the first exemplary embodiment. The same reference signs therefore refer to identical or functionally identical elements to FIG. 1.

The main line 5 has a curved section 8. The curved section 8 lies outside a predefined region 7, and therefore a refrigerant which is supplied to the curved section 8 via the refrigerant inlet 3 is homogenized during the predefined region 7 of the main line 5. Homogenized refrigerant therefore always reaches the distributor 4, and therefore the distributor 4 distributes the refrigerant uniformly to the parallel lines 6.

In particular, in the event that the predefined distance between distributor 4 and curved region 8 should not be maintained, a source of interference 9 is present on a radially outer inner wall 14 of the main line 5, in particular on an inner wall of the curved section 8. The source of interference 9 has the form of an edge and serves for separating the refrigerant, and therefore the refrigerant is homogenized. Since a liquid phase of the refrigerant predominantly prevails in the region of the source of interference 9, the liquid phase is separated from the inner wall 14. A homogeneous mixture of the refrigerant therefore again reaches the distributor 4, and therefore the distributor 4 divides the refrigerant uniformly between the parallel lines 6.

Figure 3:
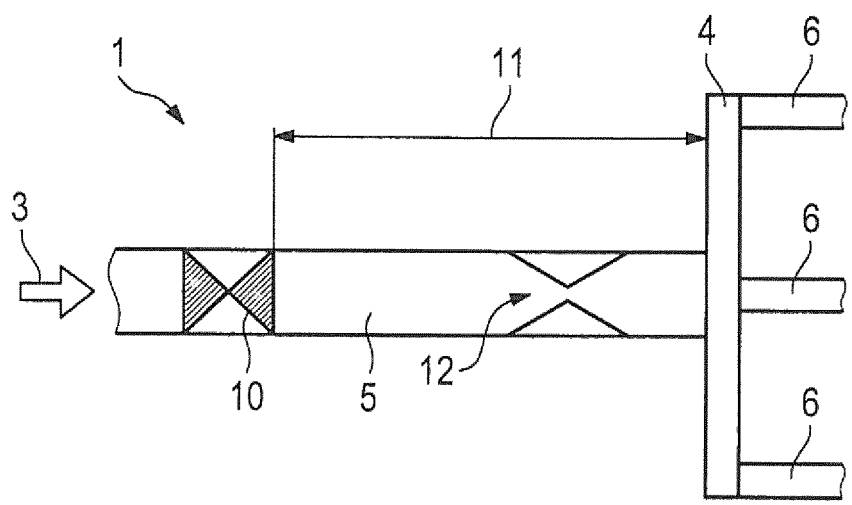
FIG. 3 is a schematic view of a cooling element according to a third exemplary embodiment of the invention.

FIG. 3 shows a cooling element 1 according to a third exemplary embodiment of the invention. The same reference signs also indicate identical or functionally identical elements as in FIG. 1 and/or FIG. 2 here. In the third exemplary embodiment, the cooling element 1 has an expansion valve 10 in the main line 5. Since the expansion valve 10 maintains a predefined distance 11 from the distributor 4, homogenization of the refrigerant within the main line 5 is initiated, and therefore a homogenized mixture of the refrigerant reaches the distributor 4. The distributor 4 therefore divides the refrigerant uniformly between the individual parallel lines 6 and the first parallel line 16.

Should the predefined distance 11 between expansion valve 10 and distributor 4 not be maintained, a nozzle 12 is advantageously arranged between the expansion valve 10 and the distributor 4. The expansion valve 10 conceals the risk of the refrigerant being divided into the individual "gaseous" and "liquid" phases. By means of the nozzle 12, the refrigerant is homogenized before reaching the distributor 4. A homogeneous mixture is therefore present which is uniformly distributed by the distributor 4.

Figure 4:
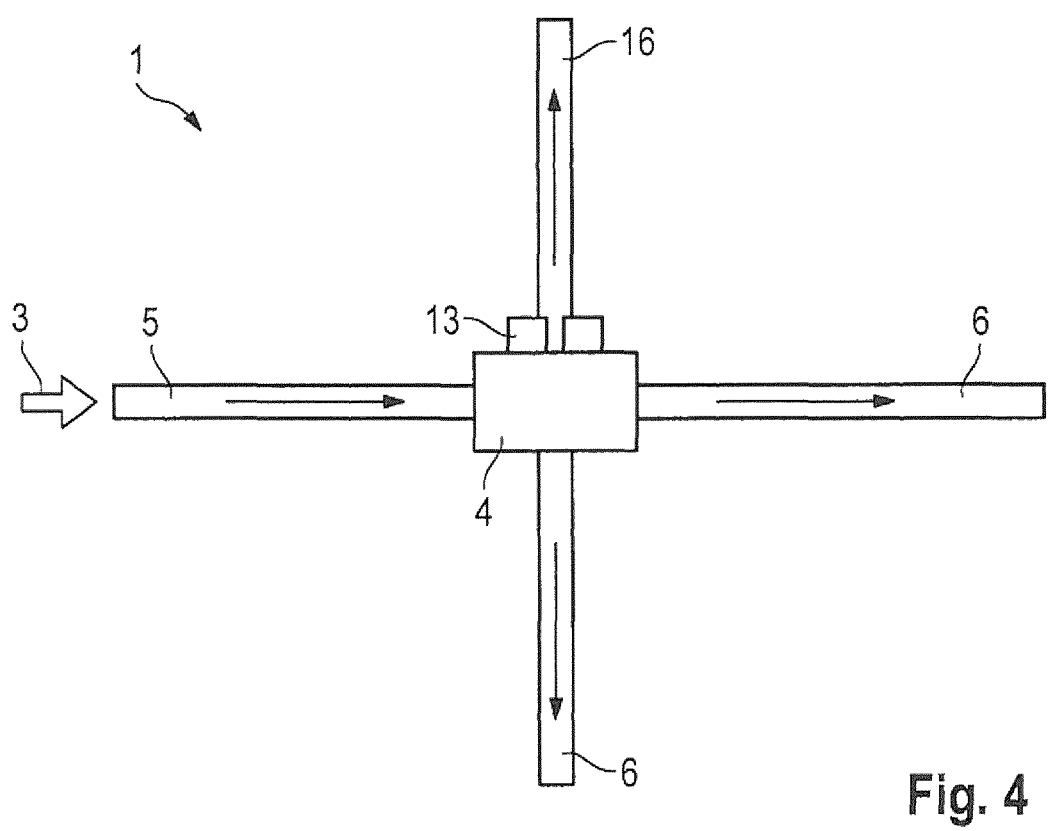
FIG. 4 is a schematic view of a cooling element according to a fourth exemplary embodiment of the invention.

FIG. 4 shows a cooling element 1 according to a fourth exemplary embodiment of the invention. The same reference signs also show identical or functionally identical elements as in FIG. 1, FIG. 2 and/or FIG. 3 here. It is apparent in the fourth exemplary embodiment that a first parallel line 16 has a smaller pressure drop than the remaining parallel lines 6. The first parallel line 16 therefore has a greater refrigerant flow, and therefore the first parallel line 16 provides a higher cooling power than the other parallel lines 6. The first parallel line 16 therefore has a reduction 13, by which a pressure loss within the first parallel line 16 is equalized with the remaining parallel lines 6. The cooling power in the first parallel line 16 and in the other parallel lines 6 is therefore identical.

By means of the cooling elements according to the first exemplary embodiment, the second exemplary embodiment and/or the third exemplary embodiment, the high-voltage battery 20 can advantageously be cooled uniformly. Temperature spreads within the high-voltage battery 20 are therefore avoided. By the avoidance of temperature spreads, a range, service life and power that can be demanded from electric vehicles and/or hybrid vehicles having the high-voltage battery 20 with the cooling element 1 according to the invention are ensured.

The individual exemplary embodiments can be combined with one another individually or completely, and therefore the advantages from the individual exemplary embodiments complement one another. In addition to the description, reference is explicitly made to the disclosure of the figures.

LIST OF REFERENCE NUMBERS

1 Cooling element
2 Battery module of the high-voltage battery
3 Refrigerant inlet
4 Distributor
5 Main line
6 Parallel lines
7 Predefined region
8 Curved section
9 Source of interference
10 Expansion valve
11 Predefined distance
12 Nozzles
13 Reduction
14 Inner wall
15 Coolant outlet
16 First parallel line
20 High-voltage battery
21 Battery cell The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A cooling element for at least one object, comprising:
a main line;
a refrigerant inlet, to which a refrigerant is supplied and which is connected to the main line, wherein the cooling element is configured to transmit heat from the object to the refrigerant; and
at least one distributor provided separately from the main line, the at least one distributor distributing the refrigerant from the main line to a multiplicity of parallel lines, wherein
the refrigerant is present in the cooling element as a two-phase mixture, and the distributor is configured to uniformly divide the refrigerant between the multiplicity of parallel lines,
the two-phase mixture comprises a liquid and a gaseous phase, and
the multiplicity of parallel lines and the main line are arranged in a same plane such that the multiplicity of parallel lines have a same height level as the main line.

2. The cooling element according to claim 1, wherein the object is a high-voltage battery.

3. The cooling element according to claim 1, wherein the distributor is configured to divide the refrigerant between the parallel lines such that a same mixing ratio of the two-phase mixture is present in each parallel line.

4. The cooling element according to claim 3, wherein:
a predefined region of the main line directly upstream of the distributor comprises exclusively rectilinear sections, or
a predefined region of the main line directly upstream of the distributor comprises at least one curved section, wherein the curved section comprises a source of interference in a radially outer inner wall of the main line, whereby homogenization of the refrigerant is achievable.

5. The cooling element according to claim 4, wherein the source of interference is an edge formed in the radially outer inner wall of the main line.

6. The cooling element according to claim 1, wherein:
a predefined region of the main line directly upstream of the distributor comprises exclusively rectilinear sections, or
a predefined region of the main line directly upstream of the distributor comprises at least one curved section, wherein the curved section comprises a source of interference in a radially outer inner wall of the main line, whereby homogenization of the refrigerant is achievable.

7. The cooling element according to claim 6, wherein the source of interference is an edge formed in the radially outer inner wall of the main line.

8. The cooling element according to claim 7, wherein the distributor or a section of the main line directly upstream of the distributor comprises a source of interference in an inner wall, whereby homogenization of the refrigerant is achievable.

9. The cooling element according to claim 1, wherein the distributor or a section of the main line directly upstream of the distributor comprises a source of interference in an inner wall, whereby homogenization of the refrigerant is achievable.

10. The cooling element according to claim 1, wherein a pressure loss within the parallel lines is identical or at least substantially identical.

11. The cooling element according to claim 1, wherein a predefined distance is maintained between an expansion valve in the main line and the distributor.

12. The cooling element according to claim 1, further comprising:

a nozzle arranged in the main line directly upstream of the distributor, whereby homogenization of the refrigerant is achievable.

13. The cooling element according to claim 12, wherein the nozzle is arranged between an expansion valve and the distributor.

14. The cooling element according to claim 1, wherein a reduction is introduced in at least one of the parallel lines.

15. The cooling element according to claim 1, wherein the distributor is a symmetrical distributor.

16. A high-voltage battery, comprising a multiplicity of battery modules and a cooling element, the cooling element comprising:
   a main line;
   a refrigerant inlet, to which a refrigerant is suppliable and which is connected to the main line, wherein the cooling element is configured to transmit heat from the object to the refrigerant; and
   at least one distributor provided separately from the main line, the at least one distributor distributing the refrigerant from the main line to a multiplicity of parallel lines, wherein
   the refrigerant is present in the cooling element as a two-phase mixture, and the distributor is configured to uniformly divide the refrigerant between the multiplicity of parallel lines,
   the two-phase mixture comprises a liquid and a gaseous phase, and
   the multiplicity of parallel lines and the main line are arranged in a same plane such that the multiplicity of parallel lines have a same height level as the main line.

17. A cooling element for a high-voltage battery, comprising:
   a main line having a refrigerant inlet through which refrigerant is supplied;
   a distributor provided separately from the main line and configured to distribute the refrigerant from the main line to a multiplicity of parallel lines, wherein heat from the high-voltage battery is transmitted to the refrigerant in the multiplicity of parallel lines, wherein
   the refrigerant in the cooling element is a two-phase mixture,
   the distributor is configured to uniformly divide the refrigerant between the multiplicity of parallel lines,
   the two-phase mixture comprises a liquid and a gaseous phase, and
   the multiplicity of parallel lines and the main line are arranged vertically in a same plane such that the multiplicity of parallel lines have a same height level as the main line.

18. The cooling element according to claim 17, wherein the distributor is configured to divide the refrigerant between the multiplicity of parallel lines such that a same mixing ratio of the two-phase mixture is obtained in each parallel line.

* * * * *